United States Patent
Condello et al.

(10) Patent No.: US 12,131,590 B2
(45) Date of Patent: Oct. 29, 2024

(54) ENVIRONMENT BLENDED PACKAGING

(71) Applicant: Xerox Corporation, Norwalk, CT (US)

(72) Inventors: Anthony S. Condello, Webster, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 919 days.

(21) Appl. No.: 16/210,628

(22) Filed: Dec. 5, 2018

(65) Prior Publication Data

US 2020/0184737 A1 Jun. 11, 2020

(51) Int. Cl.
*G07B 17/00* (2006.01)
*B41M 3/14* (2006.01)
*G06Q 10/0832* (2023.01)

(52) U.S. Cl.
CPC ......... *G07B 17/00508* (2013.01); *B41M 3/14* (2013.01); *G06Q 10/0832* (2013.01); *G07B 2017/00604* (2013.01)

(58) Field of Classification Search
CPC ... G07B 17/00508; G07B 2017/00604; B41M 3/14; G06Q 10/0832
See application file for complete search history.

(56) References Cited

U.S. PATENT DOCUMENTS

| | | | | |
|---|---|---|---|---|
| 6,505,169 B1 * | 1/2003 | Bhagavath | ......... | G06Q 30/0277 709/219 |
| 7,158,666 B2 * | 1/2007 | Deshpande | ............ | H04N 5/272 382/218 |
| 8,103,959 B2 * | 1/2012 | Cannon | ................... | G06Q 10/10 715/753 |
| 8,547,401 B2 * | 10/2013 | Mallinson | ............. | A63F 13/217 345/632 |
| 8,797,353 B2 * | 8/2014 | Bregman-Amitai | ........................ | H04N 1/00323 345/633 |
| 9,019,555 B1 * | 4/2015 | Chappell | ............... | G06F 3/1288 283/105 |
| 9,355,499 B1 * | 5/2016 | Johnson | ............. | H04N 1/00209 |
| 9,443,147 B2 * | 9/2016 | Mei | ..................... | H04N 21/4722 |
| 9,589,372 B1 * | 3/2017 | Bean | ....................... | G06V 20/46 |
| 9,652,895 B2 * | 5/2017 | Sumner | .................... | G06T 19/20 |
| 9,721,391 B2 * | 8/2017 | Monaghan | ........... | H04N 9/3194 |
| 9,721,394 B2 * | 8/2017 | Rosenthal | ............ | H04N 23/632 |
| 9,754,397 B1 * | 9/2017 | Piemonte | ................ | G06T 11/60 |
| 10,019,846 B1 * | 7/2018 | York | ....................... | A63F 13/00 |

(Continued)

OTHER PUBLICATIONS

Elina Rusko, "Expectations and Challenges of Consumer Package Customisation", published by Society for Imaging Science and Technology, published in 2007, all pages (Year: 2007).*

(Continued)

*Primary Examiner* — Omar Zeroual

(57) ABSTRACT

A system and a method for printing an environment blended package are disclosed. For example, the method is executed by a processor and includes receiving an order for a product, determining dimensions of a package to ship the product, receiving an image of a location of where the package is to be delivered, wherein the aspect ratio of the image that is captured is based on the dimensions of the package, printing a location image on a side of the package in the aspect ratio of the image to create the environment blended package such that the location image matches the location where the package is to be delivered.

20 Claims, 6 Drawing Sheets

(56) References Cited

U.S. PATENT DOCUMENTS

| | | | | |
|---|---|---|---|---|
| 10,467,391 | B1* | 11/2019 | Bertsch | H04L 9/3239 |
| 10,839,332 | B1* | 11/2020 | McBride | G07B 17/00508 |
| 2003/0028433 | A1* | 2/2003 | Merriman | G06Q 30/0277 |
| | | | | 705/14.58 |
| 2004/0182925 | A1* | 9/2004 | Anderson | B07C 3/20 |
| | | | | 340/572.1 |
| 2006/0036502 | A1* | 2/2006 | Farrell | G06Q 20/208 |
| | | | | 705/26.1 |
| 2006/0161506 | A1* | 7/2006 | Stumm | G07B 17/00435 |
| | | | | 705/406 |
| 2008/0133659 | A1* | 6/2008 | Aldrey | G06Q 10/08 |
| | | | | 709/204 |
| 2009/0285483 | A1* | 11/2009 | Guven | G06Q 30/016 |
| | | | | 345/473 |
| 2010/0238267 | A1* | 9/2010 | Izzat | H04N 13/275 |
| | | | | 348/E13.001 |
| 2011/0055049 | A1* | 3/2011 | Harper | G06Q 20/28 |
| | | | | 707/E17.014 |
| 2011/0134108 | A1* | 6/2011 | Hertenstein | G06T 19/006 |
| | | | | 345/419 |
| 2011/0216179 | A1* | 9/2011 | Dialameh | G06F 16/955 |
| | | | | 348/E7.085 |
| 2011/0254861 | A1* | 10/2011 | Emura | G06T 19/006 |
| | | | | 345/633 |
| 2012/0017238 | A1* | 1/2012 | Miller | H04H 60/48 |
| | | | | 725/32 |
| 2012/0022924 | A1* | 1/2012 | Runnels | G06Q 30/02 |
| | | | | 235/375 |
| 2012/0143361 | A1* | 6/2012 | Kurabayashi | H04R 5/04 |
| | | | | 700/94 |
| 2012/0230538 | A1* | 9/2012 | Calman | G06Q 30/02 |
| | | | | 382/103 |
| 2012/0256956 | A1* | 10/2012 | Kasahara | G06T 7/73 |
| | | | | 345/633 |
| 2012/0327117 | A1* | 12/2012 | Weller | G06T 19/006 |
| | | | | 345/633 |
| 2013/0016409 | A1* | 1/2013 | Kurtz | B41M 3/14 |
| | | | | 359/9 |
| 2013/0026220 | A1* | 1/2013 | Whelihan | G06F 16/9554 |
| | | | | 235/375 |
| 2013/0032634 | A1* | 2/2013 | McKirdy | G06K 7/1413 |
| | | | | 235/375 |
| 2013/0063487 | A1* | 3/2013 | Spiegel | G06Q 30/02 |
| | | | | 345/633 |
| 2013/0063620 | A1* | 3/2013 | Kim | G06K 7/10 |
| | | | | 348/222.1 |
| 2013/0212453 | A1* | 8/2013 | Gudai | G06F 16/9554 |
| | | | | 715/202 |
| 2013/0317912 | A1* | 11/2013 | Bittner | G06Q 50/01 |
| | | | | 345/633 |
| 2014/0100997 | A1* | 4/2014 | Mayerle | G06T 19/006 |
| | | | | 705/27.2 |
| 2014/0108136 | A1* | 4/2014 | Zhao | G06Q 30/0252 |
| | | | | 705/333 |
| 2014/0210857 | A1* | 7/2014 | Liu | G06T 19/006 |
| | | | | 345/633 |
| 2014/0223462 | A1* | 8/2014 | Aimone | A61B 5/369 |
| | | | | 725/10 |
| 2014/0247278 | A1* | 9/2014 | Samara | G06T 11/00 |
| | | | | 345/633 |
| 2014/0253743 | A1* | 9/2014 | Loxam | H04N 5/272 |
| | | | | 348/207.1 |
| 2014/0267404 | A1* | 9/2014 | Mitchell | G06T 19/006 |
| | | | | 345/633 |
| 2014/0282220 | A1* | 9/2014 | Wantland | G06F 3/011 |
| | | | | 715/782 |
| 2014/0340423 | A1* | 11/2014 | Taylor | G06T 7/00 |
| | | | | 345/633 |
| 2015/0009233 | A1* | 1/2015 | Phillips | G06T 19/006 |
| | | | | 345/633 |
| 2015/0012426 | A1* | 1/2015 | Purves | G02B 27/017 |
| | | | | 705/41 |
| 2015/0022645 | A1* | 1/2015 | Bouazizi | H04N 13/122 |
| | | | | 348/51 |
| 2015/0070347 | A1* | 3/2015 | Hofmann | G06F 3/0346 |
| | | | | 345/419 |
| 2015/0106225 | A1* | 4/2015 | Glass | G06Q 20/12 |
| | | | | 705/26.7 |
| 2015/0120616 | A1* | 4/2015 | Sullivan | G06F 3/0481 |
| | | | | 706/11 |
| 2015/0148940 | A1* | 5/2015 | Ben-David | B31B 50/022 |
| | | | | 198/689.1 |
| 2015/0348329 | A1* | 12/2015 | Carre | H04N 21/42202 |
| | | | | 345/633 |
| 2015/0379770 | A1* | 12/2015 | Haley, Jr. | G09G 5/006 |
| | | | | 345/633 |
| 2016/0050465 | A1* | 2/2016 | Zaheer | H04N 21/6125 |
| | | | | 725/34 |
| 2016/0063484 | A1* | 3/2016 | Carpenter | G06Q 20/3263 |
| | | | | 705/41 |
| 2016/0180590 | A1* | 6/2016 | Kamhi | G06T 19/006 |
| | | | | 345/633 |
| 2016/0203645 | A1* | 7/2016 | Knepp | G06F 16/434 |
| | | | | 345/633 |
| 2016/0347018 | A1* | 12/2016 | Carroll | B65D 5/0254 |
| 2017/0070779 | A1* | 3/2017 | Kim | H04N 21/8549 |
| 2017/0185596 | A1* | 6/2017 | Spirer | G06F 40/134 |
| 2017/0200131 | A1* | 7/2017 | van't Westeinde | G06Q 10/047 |
| 2017/0206040 | A1* | 7/2017 | Gaash | G06F 3/1256 |
| 2017/0206711 | A1* | 7/2017 | Li | G06V 10/95 |
| 2017/0286033 | A1* | 10/2017 | Mishima | H04N 1/00411 |
| 2017/0330361 | A1* | 11/2017 | Fisher | G06F 16/00 |
| 2017/0352187 | A1* | 12/2017 | Haines | G06T 19/006 |
| 2018/0012630 | A1* | 1/2018 | Thomée | G06V 10/40 |
| 2018/0040161 | A1* | 2/2018 | Tierney | G06F 3/015 |
| 2018/0060663 | A1* | 3/2018 | Baskin | G06T 13/80 |
| 2018/0075883 | A1* | 3/2018 | Aroyo | H04N 9/87 |
| 2018/0095542 | A1* | 4/2018 | Mallinson | G06T 19/006 |
| 2018/0165888 | A1* | 6/2018 | Duan | H04W 4/02 |
| 2018/0174195 | A1* | 6/2018 | Agarwal | G06V 20/20 |
| 2018/0192160 | A1* | 7/2018 | Ravindran | H04N 21/23418 |
| 2018/0204060 | A1* | 7/2018 | Merchant | G06K 19/06037 |
| 2018/0205999 | A1* | 7/2018 | Garrett | G06T 19/006 |
| 2018/0288396 | A1* | 10/2018 | Bouazizi | H04N 13/117 |
| 2018/0300917 | A1* | 10/2018 | Barnett | H04W 4/02 |
| 2018/0315014 | A1* | 11/2018 | Utsumi | G06Q 10/0835 |
| 2018/0316910 | A1* | 11/2018 | Kashibuchi | G06V 20/20 |
| 2018/0322523 | A1* | 11/2018 | Letson | G06Q 30/0643 |
| 2019/0090035 | A1* | 3/2019 | Eksten | H04L 65/764 |
| 2019/0244407 | A1* | 8/2019 | Wiesel | G06T 11/00 |
| 2019/0289084 | A1* | 9/2019 | Duan | G06V 10/22 |
| 2019/0320077 | A1* | 10/2019 | Kirby | B31B 50/26 |
| 2019/0354766 | A1* | 11/2019 | Moore | G06V 30/153 |
| 2020/0311656 | A1* | 10/2020 | Cole | G06T 17/00 |
| 2020/0356831 | A1* | 11/2020 | Principato | G06K 19/06046 |
| 2020/0376875 | A1* | 12/2020 | Scmitt-Lewen | B41M 3/14 |

OTHER PUBLICATIONS

Tim Ginn, "Display Objects: Prototyping Functional physical interfaces on 3D Styrofoam, Paper or Cardboard models", published by TEI in 2010, all pages (Year: 2010).*

* cited by examiner

ENVIRONMENT BLENDED PACKAGING

The present disclosure relates generally to custom printed packaging and, more particularly, to a system and method for printing environment blended packaging.

BACKGROUND

More and more users are shopping online. Soon, customers will order more products online and have the products delivered rather than go to a brick and mortar store to buy the products. Couriers used to require signatures for packages that were delivered. However, as packages are typically delivered during daytime hours when customers are at the office working, more couriers have begun to drop off packages without signature. For example, the packages may be left on a front porch or near the garage in the open.

Leaving the package without a signature has become a convenience for customers. However, the convenience of leaving a package at a customer's house without a signature has led to an unintended consequence. Package theft is on the rise. Unscrupulous individuals are going around to homes and stealing packages that are left for the customer. Individuals can drive around neighborhoods and easily spot brown cardboard boxes that are left on the porch or out in the open of a customer's home. Package theft can cost retailers millions of dollars a year as the retailer may replace the stolen products, have to file claims, investigate who stole the packages, and the like.

SUMMARY

According to aspects illustrated herein, there are provided a method, non-transitory computer readable medium and apparatus for printing an environment blended package. One disclosed feature of the embodiments is a method that receives an order for a product, determines dimensions of a package to ship the product, receives an image of a location of where the package is to be delivered, wherein the aspect ratio of the image that is captured is based on the dimensions of the package, prints a location image on a side of the package in the aspect ratio of the image to create the environment blended package such that the location image matches the location where the package is to be delivered.

Another disclosed feature of the embodiments is a non-transitory computer-readable medium having stored thereon a plurality of instructions, the plurality of instructions including instructions which, when executed by a processor, cause the processor to perform operations that receive an order for a product, determine dimensions of a package to ship the product, receive an image of a location of where the package is to be delivered, wherein the aspect ratio of the image that is captured is based on the dimensions of the package, print a location image on a side of the package in the aspect ratio of the image to create the environment blended package such that the location image matches the location where the package is to be delivered.

Another disclosed feature of the embodiments is an apparatus comprising a processor and a computer-readable medium storing a plurality of instructions which, when executed by the processor, cause the processor to perform operations that receive an order for a product, determine dimensions of a package to ship the product, receive an image of a location of where the package is to be delivered, wherein the aspect ratio of the image that is captured is based on the dimensions of the package, print a location image on a side of the package in the aspect ratio of the image to create the environment blended package such that the location image matches the location where the package is to be delivered.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a system and method for printing an environment blended package. As discussed above, more and more packages are being stolen from customers' homes. The current packaging or boxes used to ship packages are easily seen by people who may pass by the house. If the courier does not hide the package or leave the package in the back yard, the package can be easily seen.

Some solutions to this problem may not be convenient for the user. For example, one traditional example is to require a signature for delivery. However, many users may be at work or may not be able to be home when the packages are delivered. Another solution may be to allow the courier access to the customer's home. However, this may lead to a greater security threat as the courier may now be able to enter the customer's home or forget to lock the door, and the like. Another solution, would be to build a secure drop box in front of a user's home. However, such a drop box may be expensive to install and may look unpleasant in front of a customer's home.

The present disclosure provides a method and system to print an environment blended package. For example, the package may be printed with an image on a side that matches a background of a location where the package may be delivered (e.g., a front porch of a user's home, a front door, a side of the house, a garage door, and the like). The image may be printed with the correct dimensions and/or proportions. As a result, the courier may place the package in a corresponding location that allows the package to be camouflaged with the surrounding background. Thus, when individuals drive by or walk by the home, the package may be more difficult to see and may provide a low cost and convenient security for packages that are left out after being delivered.

Figure 1:
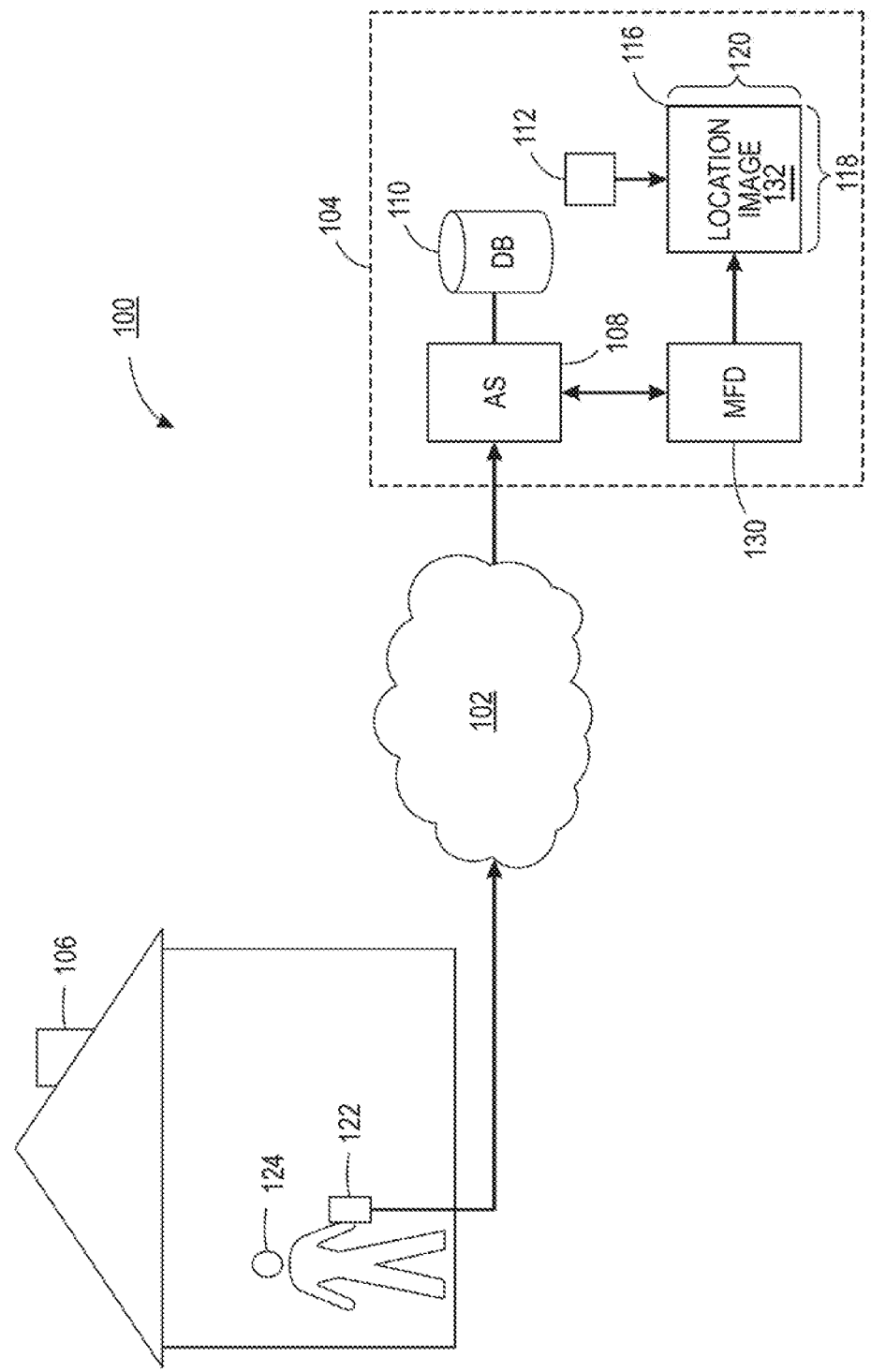
FIG. 1 illustrates an example system of the present disclosure.

FIG. 1 illustrates an example system 100 of the present disclosure. In one example, the system 100 may include an Internet protocol (IP) network 102, a retailer 104 and a location 106 of a customer 124. The location 106 may be a home of the customer 124. In one example, the customer 124 may use a mobile endpoint device 122 to place an order for a product 112 of the retailer 104.

In one example, the mobile endpoint device 122 may establish a communication session with an application server (AS) 108 over the IP network 102 to place the order. The IP network 102 may be any type of IP network that can allow the mobile endpoint device 122 to communicate with the AS 108 of the retailer 104. The IP network 102 may include various network elements and access networks that are not shown. For example, the IP network 102 may include border elements, gateways, firewalls, routers, switches, and the like. The IP network 102 may include access networks such as cellular networks, broadband networks, and the like.

Figure 2:
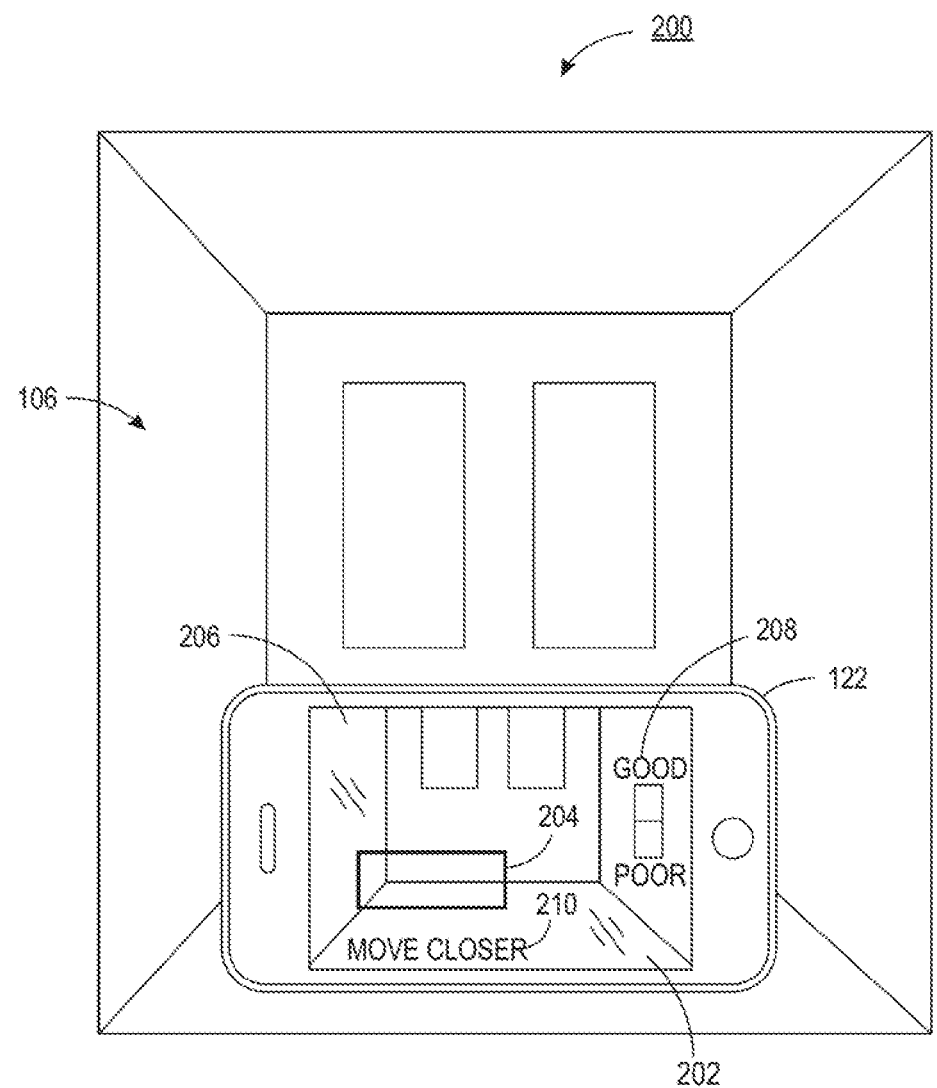
FIG. 2 illustrates an example application on a graphical user interface of a mobile endpoint device of a customer of the present disclosure.
Figure 3:
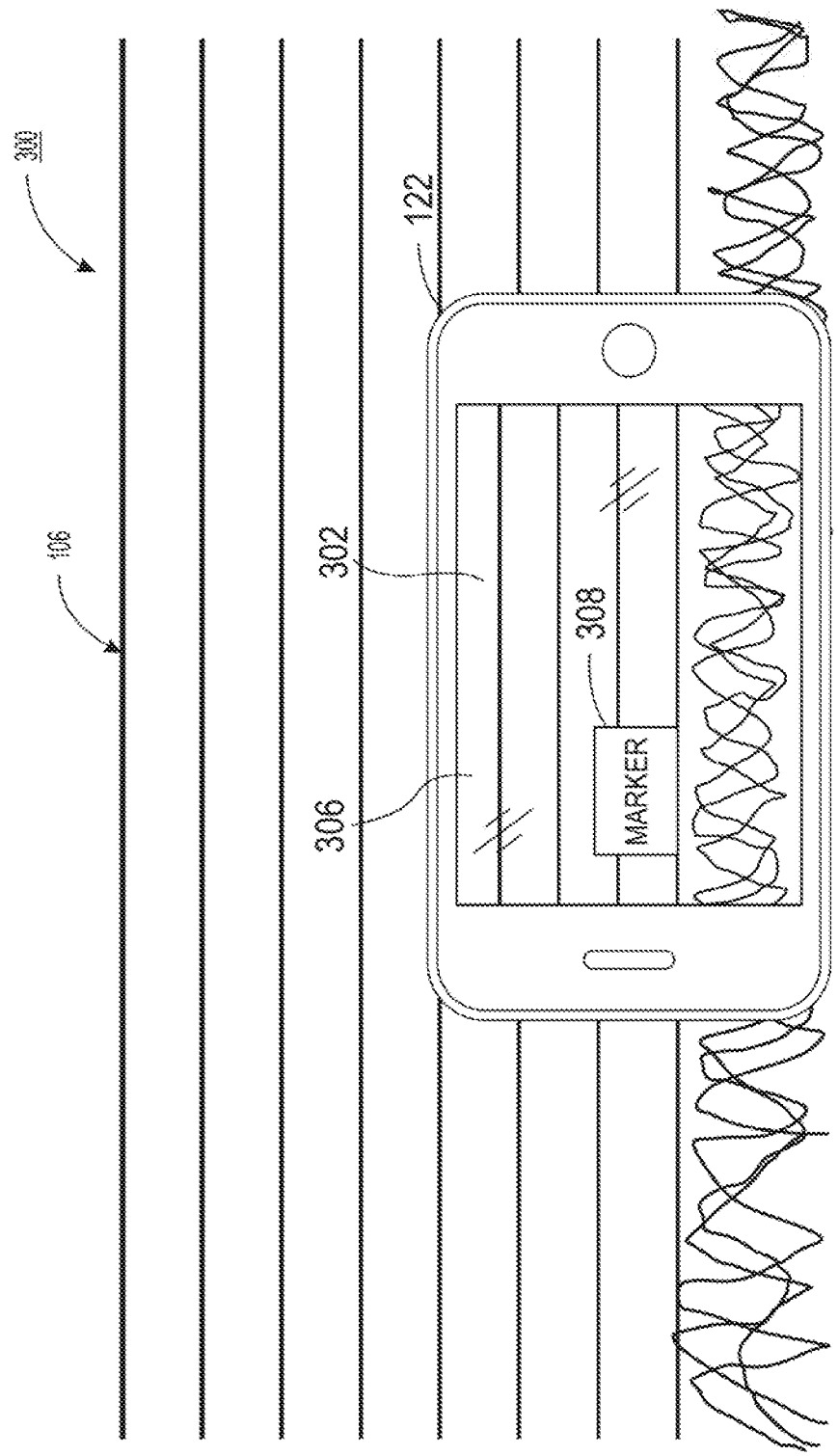
FIG. 3 illustrates another example of the application on a graphical user interface of the mobile endpoint device of the customer of the present disclosure.

In one example, the mobile endpoint device 122 may be any type of mobile computing device with a camera. For example, the mobile endpoint device 122 may be a laptop computer, a tablet computer, a smart phone, and the like. The mobile endpoint device 122 may execute an application associated with the retailer 104. The application may be issued by the retailer 104 to allow the user to place the order for the product 112 via the mobile endpoint device 122. Examples of a user interface of the application are illustrated in FIGS. 2 and 3 and discussed in further details below.

In one example, the mobile endpoint device 122 may include a camera as noted above. The camera may be used to capture images of different portions or spots of the location 106, as discussed in further details below. The image may capture an area at the location 106 where the product 112 may be delivered. The image may be used to create an environment blended package, as discussed in further details below.

In one example, the AS 108 may be a computing device, a server, and the like. The AS 108 may include a processor and a memory storing instructions executed by the processor to perform the functions described herein. In one example, the retailer 104 may also include a database (DB) 110. The DB 110 may be communicatively coupled to the AS 108. The DB 110 may store customer information, customer profiles (e.g., username, password, order history, delivery addresses, and the like), product information, and the like.

In one embodiment, the customer 124 may place an order for the product 112 via the mobile endpoint device 122 as note above. In one example, the AS 108 may determine dimensions of a package 116 that can be used to ship the product 112. The dimension may include a width 118, and a length 120 of a side of the package 116. The side may be an outer side that would face away from the location 106 (e.g., the home of the customer 124).

In one embodiment, the AS 108 may then prompt the customer 124 to capture an image of an area where the customer 124 would like to have the package 116 delivered. The prompt may be through a graphical user interface (GUI) shown in the application executed by the mobile endpoint device 122. In one example, in response to receiving the order, the AS 108 may cause the mobile endpoint device 122 to automatically launch the GUI to prompt the user to capture an image.

In one embodiment, the GUI may be an augmented reality (AR) user interface that includes a graphical image of the package 116 and the dimensions 118 and 120 of the package 116. The AR interface may provide the customer 124 with a perspective of how close or far away to capture an image of the area at the location 106 where the package 116 may be delivered. Capturing the proper perspective may allow the image to have the correct aspect ratio relative to the dimensions 118 and 120 of the package 116.

In another example, the retailer 104 may provide the customer 124 with a marker. The marker may be labeled with dimensions. The customer 124 may place the marker in any area of the location 106 where the package 116 is to be delivered. The customer 124 may then capture any image and the marker may allow the aspect ratio of the image to be determined. Examples of the AR interface and the marker are illustrated in FIGS. 2 and 3, and discussed in further details below.

After the image is captured, the customer 124 may transmit the image to the AS 108 via the mobile endpoint device 122. The AS 108 may determine the correct aspect ratio of a location image 132 that can be printed by a multi-function device (MFD) 130. In other words, the aspect ratio defines dimensions of the location image 132 that is to be printed on the package 116 such that the location image 132 may match an area of the location 106 where the package 116 may be placed. For example, if the location image 132 is printed with the incorrect aspect ratio, the location image 132 may not match the surroundings at the location 106 where the package 116 is to be delivered.

The AS 108 may determine the correct aspect ratio of the location image 132 to be printed and send the instructions to the MFD 130 to print the location image 132. In one example, the location image 132 may be printed directly on the side of the package 116. In another embodiment, the location image 132 may be printed on an adhesive label. The adhesive label may have the same dimensions 118 and 120 as a side of the package 116. The adhesive label with the location image 132 may then be applied to the side of the package 116.

Figure 4:
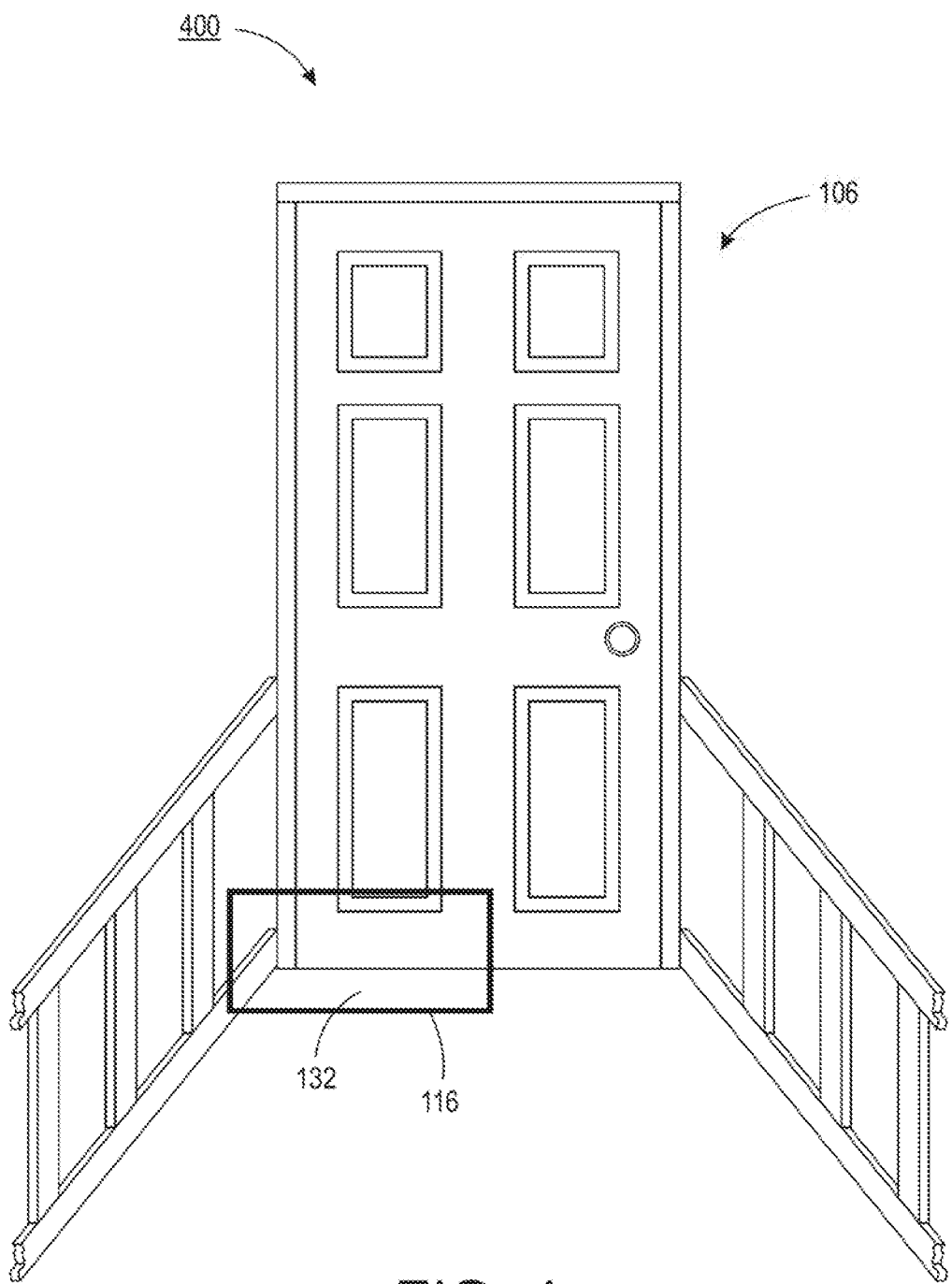
FIG. 4 illustrates an example of an environment blended package of the present disclosure.

The location image 132 may create the environment blended package. In other words, the environment blended package may be camouflaged at the location 106 when the package 116 is placed in the corresponding area at the location 106. For example, the image may be captured at the front door. The location image 132 may include part of the front door and the concrete patio where the package 116 may be delivered at the location 106. Thus, when the package 116 is delivered to the location 106, the environment blended package may blend in with the front door and the patio at the location 106. As a result, when individuals drive by the location 106, the package 116 may not be easily visible. An example of the environment blended package is illustrated in FIG. 4, and discussed in further details below.

In one embodiment, multiple sides of the package 116 may be printed with the location image 132. For example, the location image 132 may include multiple images from different viewpoints or viewing angles (e.g. an image from the street and image from a side of the house). In one embodiment, the images from the different viewing angles may be averaged and printed onto multiple sides of the package 116. Thus, the multiple sides of the package 116 may be printed with different views of different location images 132. As a result, the environment blended package may appear camouflaged whether looking at the package from the front of the house on the street or approaching the package from the side of the house driving down the street.

In one embodiment, a side of the package 116 that may be placed next to the house, wall, door, and the like at the location 106 may include delivery information, instructions for placement of the package 116 at the location 106, and the like. For example, since the package 116 may be placed at the location 106 with at least one side that is not visible, the delivery information may be printed or applied to the side that is adjacent to the house at the location 106.

FIG. 2 illustrates an example 200 that shows an example GUI 202 on the mobile endpoint device 122 of the customer 124. The GUI 202 may be used to capture an image 206 of the location 106 where the package 116 may be delivered that contains the product 112 that is ordered by the customer 124.

In one embodiment, the GUI 202 may be an AR interface. For example, a graphical image 204 may be displayed in the GUI 202. The graphical image 204 may be a representation of the package 116 and show what the dimensions 118 and 120 of the package 116 may look like at the location 106.

In one embodiment, the GUI 202 using the graphical image 204 may help the customer 124 to take the image 206 having a correct aspect ratio. As a result, the location image 132 that is printed based on the image 206 captured by the mobile endpoint device 122 may properly camouflage the package 116.

In one embodiment, the GUI 202 may provide a camouflage meter 208. The camouflage meter may indicate to the customer 124 how well hidden the environment blended package (e.g., the package 116 with the location image 132) may be at the location 106. For example, the more details and more contrast of different colors and patterns that appear in the image 206, the better the reading on the camouflage meter. In other words, more details and more contrast of different colors and patterns may provide better camouflage for the package 116. In contrast, the less variation in and colors captured in the image 206, the worse the camouflage may be for the package 116.

In one embodiment, the customer 124 may move the mobile endpoint device 112 around to different areas of the location 106. For example, the customer 124 may point the camera on the mobile endpoint device 122 at a front door where the package 116 may be delivered. The GUI 202 may provide a camouflage reading based on the image 206. The customer 124 may then point the camera on the mobile endpoint device 122 on the garage door and receive another camouflage reading from the camouflage meter 208. The customer 124 may point the camera on a side of the house with siding and grass to receive another camouflage reading. The customer 124 may select the image 206 with the best reading from the camouflage meter 208.

In one embodiment, the GUI 202 may also include an aspect ratio guide 210. The aspect ratio guide 210 may indicate to the customer 124 whether the camera on the mobile endpoint device 122 should be moved closer or further away. For example, if the image 206 is captured too far away, the details in the location image 132 may appear too small on the package 116. If the image 206 is captured too close, the details in the location image 132 may appear too big. Thus, the GUI 202 may guide the customer 124 to take the image 206 that has the correct aspect ratio based on the graphical image 204.

The customer 124 may then send the captured image 206 to the AS 108 via the mobile endpoint device 122 and the IP network 102. The AS 108 may then control the MFD 130 at the retailer 104 to print the location image 132, as described above.

FIG. 3 illustrates an example 300 that shows another example of a GUI 302 of the application that is executed on the mobile endpoint device 122. In one example, the retailer 104 may send the customer 124 a marker 308, as noted above. The marker 308 may include dimensions on the marker 308 or may have known dimensions (e.g., a length and a width of a side of the marker 308 that faces the camera on the mobile endpoint device 122).

The customer 124 may place the marker 308 at a location where the package 116 may be delivered. The customer 124 may then capture an image 306 of the location 106 that includes the marker 308. As a result, the customer 124 may capture an image and the AS 108 may generate the correct aspect ratio for the location image 132 based on the marker 308 in the image 306.

The GUI 302 may also include the camouflage meter 208 illustrated in FIG. 2. In one embodiment, the customer 124 may move the marker 308 to different areas at the location 106 where the package 116 may be delivered. The camouflage meter 208 may then provide different readings based on the image 306, as described above.

FIG. 4 illustrates an example 400 of the environment blended package that is delivered to the location 106. The environment blended package may comprise the package 116 with the location image 132 that is printed by the MFD 130 at the retailer 104.

In one example, the location image 132 may be based on the image 206 that was captured and shown in FIG. 2. The location image 132 may be applied to the side of the package 116 that may face the street or away from the house.

As can be seen in FIG. 4, the location image 132 may be blend into the environment at the location 106. For example, the location image 132 may include a portion of the railing of the porch, the front door, and the concrete patio. Thus, when the package 116 is viewed from the street, an individual may not be able to see the package 116. In other words, the package 116 may be hidden from view due to the location image 132 on the package 116.

In one embodiment, the location image 132 may be printed over multiple packages 116. For example, a customer may order multiple products 112 that are delivered in two or more different packages 116. When multiple packages 116 are delivered, the image 206 or 306 may be captured for the multiple packages 116.

The location image 132 may also be printed for the multiple packages 116. For example, if three different packages 116 are delivered, then the location image 132 may be printed as three different images on each one of the three packages 116.

In one embodiment, the different images of the location image 132 may include an indicator to convey to a courier the sequence in which the packages 116 should be stacked at the location 106. For example, the indicator may be a number on the images (e.g., box 1 of 3, 2 of 3, and 3 of 3). The numbers may be printed on the images such that they are small enough to not disrupt the camouflage effect of the location image 132 on the packages 116.

In one example, the AS 108 may transmit an instruction to the courier when the package 116 with the location image 132 is ready for delivery. For example, the instruction may include the image 206 or 306 of the location 106 where the package 116 may be delivered. As a result, the courier may know where to leave the package 116 such that the location image 132 is environmentally blended with the area of the location 106. Thus, the environment blended package of the present disclosure provides greater security for packages 116 that may be delivered without a customer signature (e.g., packages 116 that are left at a customer's home).

Figure 5:
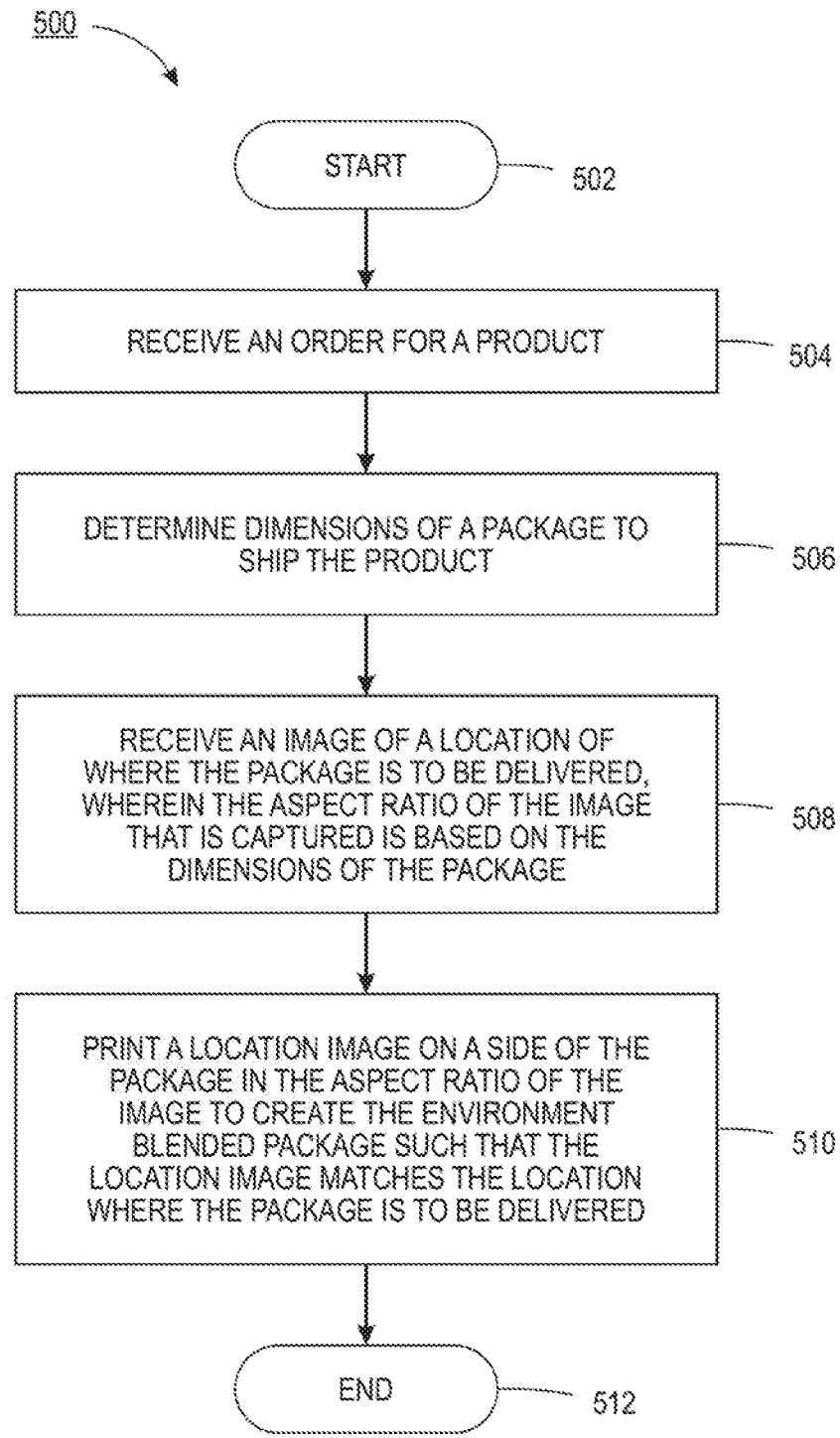
FIG. 5 a flowchart of an example method for printing an environment blended package of the present disclosure.
Figure 6:
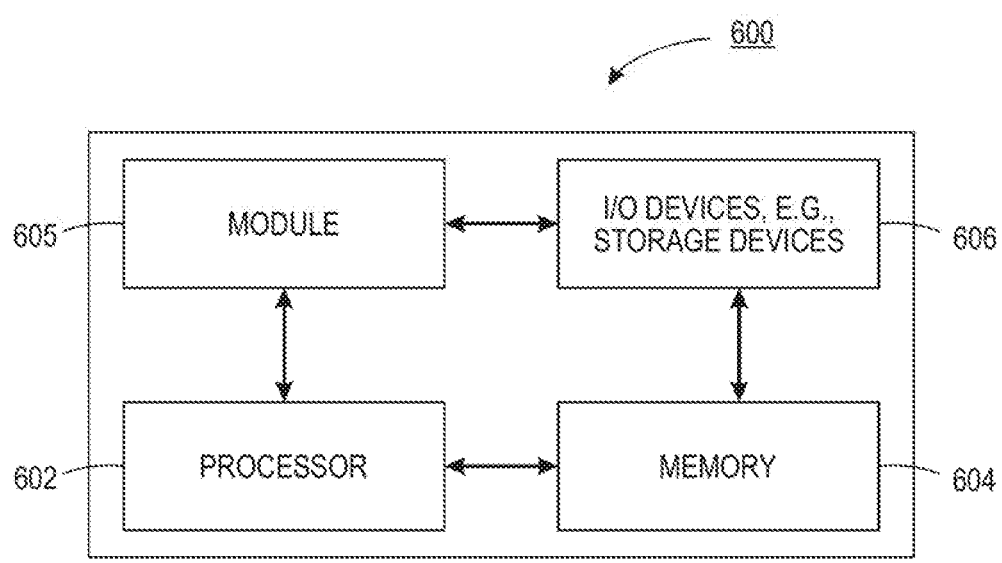
FIG. 6 illustrates a high-level block diagram of a computer suitable for use in performing the functions described herein.

FIG. 5 illustrates a flowchart of an example method 500 for printing an environment blended package of the present disclosure. In one embodiment, one or more steps or operations of the method 500 may be performed by the system 100, the AS 108 of the retailer 104, or a computer as illustrated in FIG. 6 and discussed below.

At block 502, the method 500 begins. At block 504 receives an order for a product. For example, a customer may order the product via an application provided by a retailer on a mobile endpoint device of the customer.

At block 506, the method 500 determines dimensions of a package to ship the product. In one embodiment, the retailer may determine the dimensions of the package that will be used to ship the product in response to the order.

In one embodiment, the application on the mobile endpoint device of the customer may be caused to automatically launch a GUI once the dimensions are determined. The GUI may guide the customer to capture an image of an area at the location where the package may be delivered. The GUI may be an AR interface or direct the customer to capture an image with a marker provided by the retailer, as described above. The GUI may assist the customer in capturing an image with a correct aspect ratio relative to the dimensions of the package.

The customer may capture an image of the area at the location where the customer would like the package to be delivered with a camera on the mobile endpoint device. After the customer captures the image where the package may be delivered, the customer may send the image to the retailer via the mobile endpoint device.

At block 508, the method 500 receives an image of a location of where the package is to be delivered, wherein the aspect ratio of the image that is captured is based on the dimensions of the package. The image may be received from the mobile endpoint device of the customer. The aspect ratio may be correctly captured based on the AR interface or the marker used in the image, as described above.

At block 510, the method 500 prints a location image on a side of the package in the aspect ratio of the image to create the environment blended package such that the location image matches the location where the package is to be delivered. In one embodiment, the aspect ratio may help to determine how large or how small the location image should be printed. In other words, the aspect ratio may ensure that the location image is correctly printed on the package. For example, when the location image is correctly printed, the location image may match the details, colors, objects, and the like, in the area at the location where the package may be delivered. At block 512, the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for printing an environment blended package of the present disclosure, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for printing an environment blended package of the present disclosure (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for printing an environment blended package of the present disclosure (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing an environment blended package, comprising:
   receiving, by a processor, an order for a product;

determining, by the processor, dimensions of a package to ship the product;

receiving, by the processor, an image of a location of where the package is to be delivered;

determining, by the processor, an aspect ratio of the image that is received is based on the dimensions of the package;

determining, by the processor, dimensions of a location image based on the aspect ratio that was determined;

generating, by the processor, instructions to print the location image with the dimensions that were determined; and causing, by the processor, a multi-function device to print the location image on a side of the package in the aspect ratio of the image in accordance with the instructions to create the environment blended package such that the location image matches the location where the package is to be delivered.

2. The method of claim 1, further comprising:

providing, by the processor, the dimensions of the package to a customer via an application on a mobile endpoint device of the customer.

3. The method of claim 2, wherein the dimension of the package are shown in an augmented reality (AR) interface.

4. The method of claim 3, wherein the AR interface comprises a graphical user interface (GUI) with an image of the location wherein the package is to be delivered with an image of the package shown in the location in accordance with the dimensions of the package.

5. The method of claim 3, wherein the AR interface comprises a camouflage meter to indicate an acceptable level of detail to improve blending of the environment blended package to the location.

6. The method of claim 1, wherein the image includes a marker with known dimensions, wherein the aspect ratio is determined based on the marker.

7. The method of claim 1, wherein the location image is printed directly on the side of the package.

8. The method of claim 1, wherein the location image is printed on an adhesive label and the adhesive label is applied to the side of the package.

9. The method of claim 1, wherein the package comprises a plurality of packages.

10. The method of claim 1, wherein a portion of the location image is printed on each one of the plurality of packages, wherein each one of the plurality of packages includes an indicator to indicate a sequence of how the plurality of packages is to be stacked at the location.

11. A non-transitory computer-readable medium storing a plurality of instructions, which when executed by a processor, causes the processor to perform operations for printing an environment blended package comprising:

receiving an order for a product;

determining dimensions of a package to ship the product;

receiving an image of a location of where the package is to be delivered;

determining an aspect ratio of the image that is received is based on the dimensions of the package;

determining dimensions of a location image based on the aspect ratio that was determined;

generating instructions to print the location image with the dimensions that were determined; and causing a multi-function device to print the location image on a side of the package in the aspect ratio of the image in accordance with the instructions to create the environment blended package such that the location image matches the location where the package is to be delivered.

12. A non-transitory computer readable medium of claim 11, further comprising:

providing the dimensions of the package to a customer via an application on a mobile endpoint device of the customer.

13. The non-transitory computer readable medium of claim 12, wherein the dimension of the package are shown in an augmented reality (AR) interface.

14. The non-transitory computer readable medium of claim 13, wherein the AR interface comprises a graphical user interface (GUI) with an image of the location wherein the package is to be delivered with an image of the package shown in the location in accordance with the dimensions of the package.

15. The non-transitory computer readable medium of claim 13, wherein the AR interface comprises a camouflage meter to indicate an acceptable level of detail to improve blending of the environment blended package to the location.

16. The non-transitory computer readable medium of claim 11, wherein the image includes a marker with known dimensions, wherein the aspect ratio is determined based on the marker.

17. The non-transitory computer readable medium of claim 11, wherein the location image is printed directly on the side of the package.

18. The non-transitory computer readable medium of claim 11, wherein the location image is printed on an adhesive label and the adhesive label is applied to the side of the package.

19. The non-transitory computer readable medium of claim 11, wherein the package comprises a plurality of packages, wherein the printing comprises printing a portion of the location image on each one of the plurality of packages, wherein each one of the plurality of packages includes an indicator to indicate a sequence of how the plurality of packages is to be stacked at the location.

20. A method for printing an environment blended package, comprising:

receiving, by a processor, an order for a product via an application on a mobile endpoint device of a customer;

determining, by the processor, dimensions of a package to ship the product;

causing, by the processor, an augmented reality (AR) interface to execute via the application on the mobile endpoint device of the customer;

displaying, by the processor, the package in the AR interface based on the dimensions of the package;

prompting, by the processor, the customer to capture an image of a location that the package is to be delivered;

receiving, by the processor, the image of a location of where the package is to be delivered;

determining, by the processor, an wherein the aspect ratio of the image that is captured is based on the dimensions of the package;

determining, by the processor, dimensions of a location image based on the aspect ratio that was determined;

generating, by the processor, instructions to print the location image with the dimensions that were determined; and causing, by the processor, a multi-function device to print the location image on a side of the package in the aspect ratio of the image in accordance with the instructions to create the environment blended package such that the location image matches the location where the package is to be delivered.

\* \* \* \* \*